(12) United States Patent
Bray

(10) Patent No.: US 8,718,812 B2
(45) Date of Patent: May 6, 2014

(54) LINEAR FRICTION WELDING OF AN AEROFOIL BLISK

(75) Inventor: Simon E. Bray, Derby (GB)

(73) Assignee: Rolls-Royce PLC, London (GB)

( * ) Notice: Subject to any disclaimer, the term of this patent is extended or adjusted under 35 U.S.C. 154(b) by 277 days.

(21) Appl. No.: 13/166,095

(22) Filed: Jun. 22, 2011

(65) Prior Publication Data

US 2012/0022678 A1 Jan. 26, 2012

(30) Foreign Application Priority Data

Jul. 20, 2010 (GB) .................................. 1012140.8

(51) Int. Cl.
*G05B 13/00* (2006.01)

(52) U.S. Cl.
USPC .......................................... 700/212; 228/102

(58) Field of Classification Search
USPC .................... 700/212; 228/29; 29/889.722
See application file for complete search history.

(56) References Cited

U.S. PATENT DOCUMENTS

| | | | |
|---|---|---|---|
| 5,865,364 A | 2/1999 | Trask et al. | |
| 6,789,051 B1 * | 9/2004 | Chen et al. | 703/2 |
| 2003/0201305 A1 | 10/2003 | Trask | |
| 2009/0185908 A1 * | 7/2009 | Chung et al. | 416/213 R |

FOREIGN PATENT DOCUMENTS

| | | |
|---|---|---|
| EP | 1 239 116 A2 | 9/2002 |
| EP | 1 495 829 A1 | 1/2005 |

OTHER PUBLICATIONS

Vairis et al., "On the extrusion stage of linear friction welding of Ti 6A1 4V" Materials Science and Engineering vol. A271, 1999 pp. 477-484.*
Zhang et al., "Research on the Adaptive Machining Technology of Blisk" Advanced Materials Research vols. 69-70. May 5, 2009 Trans Tech Publications. pp. 446-450.*
Sorina-Muller et al., "FEM simulation of the linear friction welding of titanium alloys" Computational Materials Science, vol. 48. 2010. pp. 749-758.*
Li et al., "Numerical simulation of linear friction welding of titanium alloy: Effects of processing parameters" Materials and Design, vol. 31. 2010. pp. 1497-1507.*
Vairis et al., "Modelling the linear friction welding of titanium blocks" Materials Science and Engineering, vol. A292. 2010. pp. 8-17.*
Vairis et al., "Modelling the linear friction welding of titanium blocks" Material Science and Engineering, 2000 pp. 8-17.*
Search Report issued in British Application No. GB 1012140.8 dated Oct. 27, 2010.

* cited by examiner

*Primary Examiner* — Mohammad Ali
*Assistant Examiner* — Emilio J Saavedra
(74) *Attorney, Agent, or Firm* — Oliff PLC

(57) ABSTRACT

A method of making an aerofoil blink comprising a plurality of aerofoil blades joined to a disc to extend radially outwardly therefrom is provided. The method includes the step of: (a) modelling a linear friction welding process in which a blade member is joined to the disc, the blade member having a stub for joining to the disc, wherein the modelling provides results which are indicative of the welding power at positions along the stub during the welding process; (b) identifying adaptations to the stub using the modelling results to compensate for differences in welding power along the stub during the welding process; (c) providing a blade member having a stub with the identified adaptations; and (d) joining the provided blade member to the disc by the linear friction welding process.

10 Claims, 6 Drawing Sheets

LINEAR FRICTION WELDING OF AN AEROFOIL BLISK

BACKGROUND

The present invention relates to a method of making an aerofoil blisk employing linear friction welding.

FIG. 1 shows an aerofoil blisk 10 which includes a plurality of blades 12 attached to a disc 14 so as to extend radially outwardly therefrom. The blades are typically of titanium, nickel or steel and are attached to the disc by linear friction welding. Blisks may be used in aero engines, both in the compressor and turbine, and can be advantageous over conventionally bladed discs.

It is known to join the blades 12 to the disc 14 by linear friction welding, this being a process whereby the disc 14 is held stationary while a blade member (comprising the as yet unmachined/unfinished blade) is oscillated tangentially against the disc 14 under a load applied in the radial direction of the blade towards the disc. The heat generated by the oscillation together with the radially inward load results in a weld between the disc 14 and the blade member, with weld material being extruded from both sides of the joint. The blade is thereby joined to the disc.

Excess material is subsequently machined away from the blade member, to result in a blade of the desired shape.

The radially inner base region of the blade member which contacts the disc 14 for joining thereto by linear friction welding is referred to as a stub. FIG. 2 shows schematically the cross-sectional shape of a prior art blade stub 16. The section is transverse to the length of the blade member, i.e. tangentially to the disc when the blade member is attached thereto. The weld oscillation direction is tangential, as indicated by the arrow A.

The stub 16 of the blade member includes a leading edge 18 and a trailing edge 20, each being smoothly curved. The stub further includes a suction side 22 and a pressure side 24, each of which curves smoothly between the leading and trailing edges 18 and 20, on its respective side of the blade member.

The curvature of the pressure side 24 is somewhat less than that of the suction side 22 and the stub 16 has a maximum width measured in the weld oscillation direction which is significantly greater in its central region than at its leading edge 18 or trailing edge 20. The arrows X indicate the leading edge width of the blade, the arrows Y the trailing edge width of the blade and the arrows Z the maximum weld width. The ratio of the maximum weld width to the minimum weld width is more than 2. This ratio is referred to as the taper ratio.

Having a relatively high taper ratio causes problems with the friction welding process. As the linear friction welding process takes place, "flash" material is pushed out to the sides of the weld, i.e. it is burnt-off. As the material is pushed out, the radially inward pressure (the forge pressure) forces the blade member in the radially inward direction. The burn-off rate of material is higher in the regions where the stub is relatively narrow in the weld oscillation direction. In these regions, the blade member does not move in the radially inward direction fast enough to keep up with the rate of burning off of material. This is because the material in the wider regions of the blade stub prevents such radially inward movement (the burn-off rate being lower in these regions). This can result in the recirculation of flash in the narrower regions and even in voids in the weld. Recirculation is damaging to the weld quality/integrity. To address these problems, EP 1495829 A discloses an approach for making an aerofoil blisk by linear friction welding in which the stub has a taper ratio of less than 2.

However, the approach of EP 1495829 A does not account for variation in energy input into the weld at different positions across the stub (e.g. at leading edge, mid-chord and trailing edge positions) caused by differential amplitude of oscillation or differential forge pressure, the differentials being caused by elastic deflections in the components and/or the tooling under the high forge and in-plane loads.

SUMMARY

Accordingly, the present invention provides a method of making an aerofoil blisk comprising a plurality of aerofoil blades joined to a disc to extend radially outwardly therefrom, the method including the steps of:

(a) modelling a linear friction welding process in which a blade member is joined to the disc, the blade member having a stub for joining to the disc, wherein the modelling provides results which are indicative of the welding power at positions along the stub during the welding process;

(b) identifying adaptations to the stub using the modelling results to compensate for differences in welding power along the stub during the welding process;

(c) providing a blade member having a stub with the identified adaptations; and (d) joining the provided blade member to the disc by the linear friction welding process.

Thus the method allows for the effects of variation in energy input into the weld to be taken into account. Advantageously, whereas conventional machine/tooling systems for linear friction welding of aerofoil blisks seek to reduce elastic deflections by e.g. the use of large clamp frames and large tooling masses, the method of the present invention allows less complex machine/tooling systems to be used as the effects of the elastic deflections on welding power can be compensated by the adapted stub.

The method may have any one or, to the extent that they are compatible, any combination of the following optional features.

In step (b), the identified adaptations are typically intended to reduce differences in burn-off rate along the stub during the welding process.

Step (a) may include modelling the mechanical response of the stub and disc, e.g. using finite element analysis, during the linear friction welding process.

In step (a), the modelling provides results which can include the amplitudes of welding oscillation at positions along the stub during the welding process and/or the welding pressures at positions along the stub during the welding process. The amplitude and the welding pressure have a strong impact on the welding power.

Preferably, in step (b), the adaptations include varying the widths of the stub at positions along the stub, the widths being in the direction of welding oscillation. Thus the taper ratio of the adapted stub can vary significantly depending on the stub widths which are needed to compensate for differences in welding power along the stub.

In step (b), the modelling results may conveniently be used in a correlation between the local burn-off rate and the term:

$$w/(a^m \cdot f \cdot (\ln P)^n)$$

to identify the adaptations, wherein w is the local width of the stub in the direction of welding oscillation, a is the local amplitude of welding oscillation, f is the welding oscillation frequency, P is the local forge pressure, and m and n are material dependent constants (typically having respective values of about 1.09 and about 0.9). The correlation may be of the form:

$$BOR = A \cdot (w/(a^m f (\ln P)^n))^B$$

wherein BOR is the local burn-off rate, and A and B are material dependent constants (typically having respective values of about 0.30 and about −0.84).

Preferably, in step (a), the positions at which the modelling provides results include the leading edge, mid-chord and trailing edge positions of the stub.

Steps (a) and (b) may be performed iteratively to refine the adaptations of the stub. That is, adaptations identified in step (b) can be remodelled in step (a). Then step (b) can be repeated so that further adaptations may be identified and further remodelling performed etc.

Embodiments of the invention will now be described by way of example with reference to the accompanying drawings in which:

DETAILED DESCRIPTION

Figure 1:
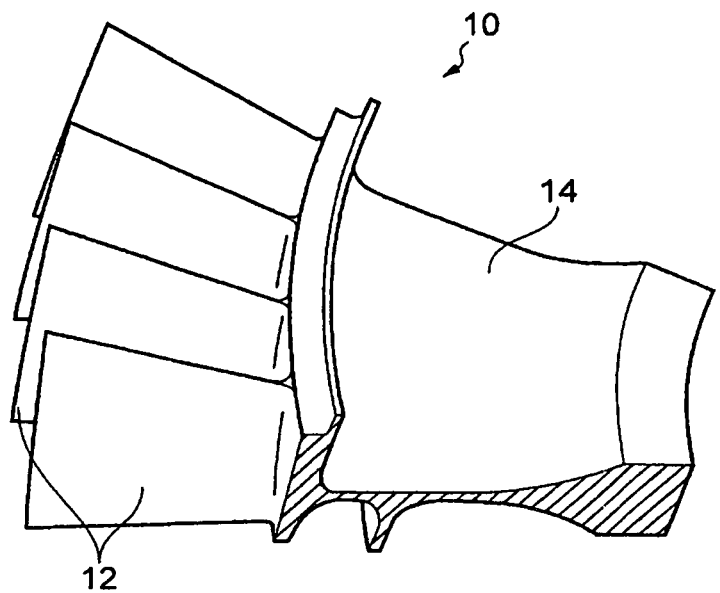
FIG. 1 shows an aerofoil blisk.
Figure 2:
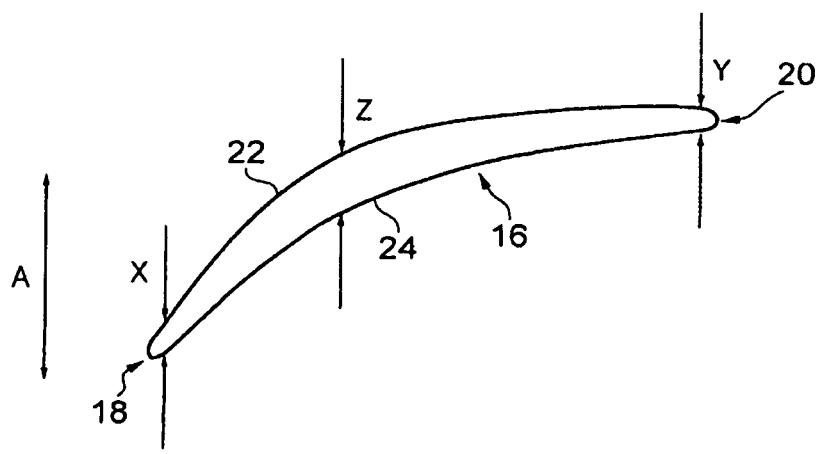
FIG. 2 shows schematically the cross-sectional shape of a prior art blade stub.
Figure 3:
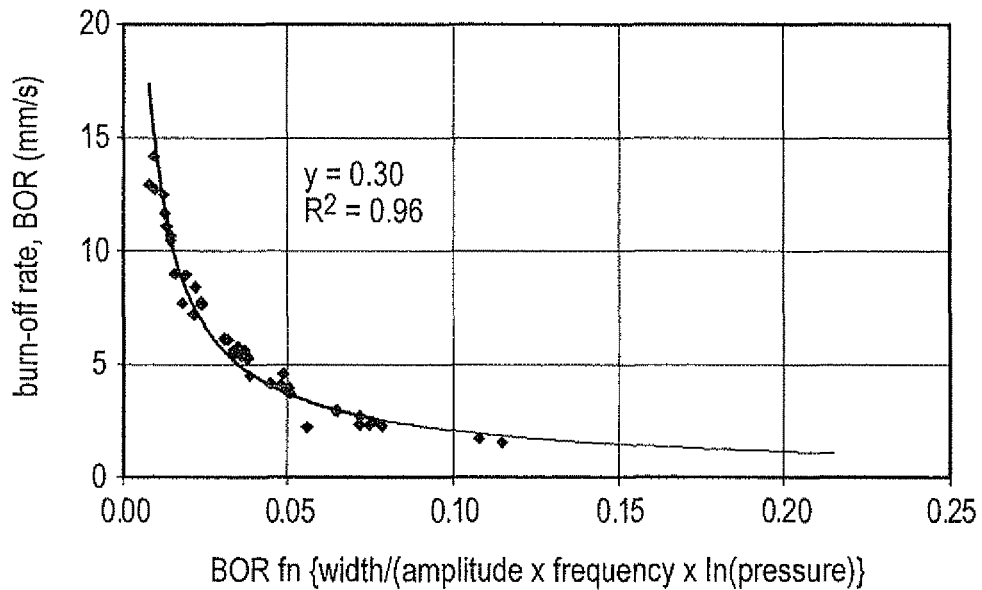
FIG. 3 shows a graph of experimentally determined burn-off rates (BOR) plotted against the term $w/(a^m \cdot f(\ln P)^n)$.

FIG. 3 shows a graph of experimentally determined burn-off rates (BOR) plotted against the term $w/(a^m \cdot f(\ln P)^n)$ for linear friction welding processes in which a blade member is joined to a disc, wherein w is the width of the stub in the direction of welding oscillation, a is the amplitude of the welding oscillation, f is the welding oscillation frequency, P is the forge pressure, and m and n are constants having respective values of 1.09 and 0.9. Also plotted is a curve of:

$$y = 0.30 x^{0.84}$$

with a high $R^2$ value, which demonstrates a high degree of correlation with the experimental points.

Using such a correlation it is possible to adapt a blade member stub, e.g. by varying the widths of the stub (the widths being measured in the weld oscillation direction) at positions along the stub to reduce differences in local burn-off rates along the stub. In particular, as the amplitude of the welding oscillation and the forge pressure can vary along the stub due to elastic deflections in components and tooling, changes can be made to the local widths to compensate for the variation.

This procedure is illustrated in relation to FIGS. 4(a) to (e), which are graphs of burn-off rate against amplitude of welding oscillation for different stub widths at the leading edge ($T_{LE}$), trailing edge ($T_{TE}$) and maximum width position ($T_{Tmax}$) which is typically close to mid-chord, the graphs being calculated from the above correlation between BOR and a assuming that f and P are invariant for a given w (although in reality P is likely to vary along the stub as well as a). The input amplitude of oscillation to the blade member is 2 mm. The unadjusted maximum width $T_{Tmax}$ of the stub is 16 mm and the unadjusted leading and trailing edge widths $T_{LE}$, $T_{TE}$ are both 10 mm.

Figure 4A:
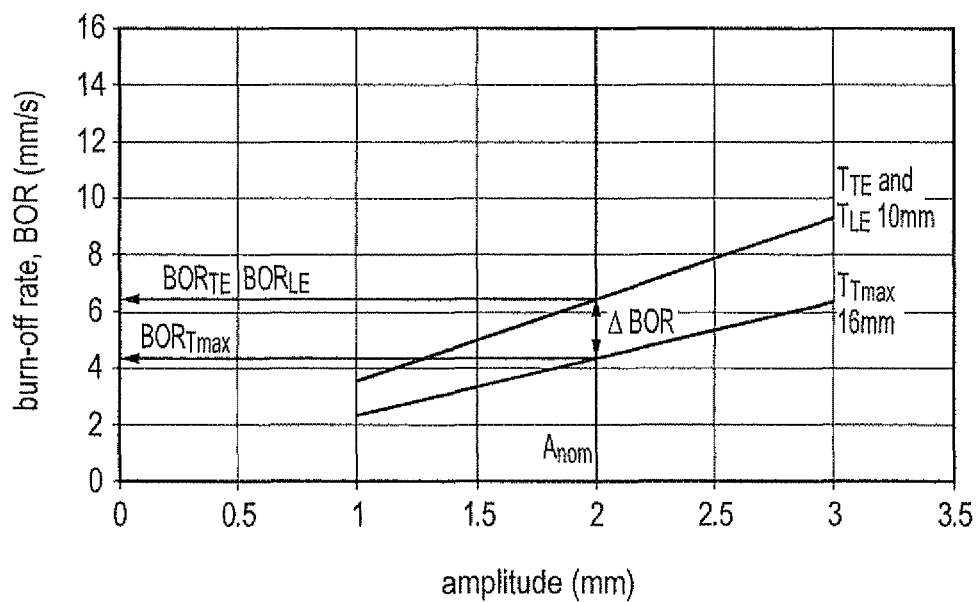
FIGS. 4(a) to (e) are graphs of burn-off rate against amplitude of welding oscillation for different stub widths.
Figure 4B:
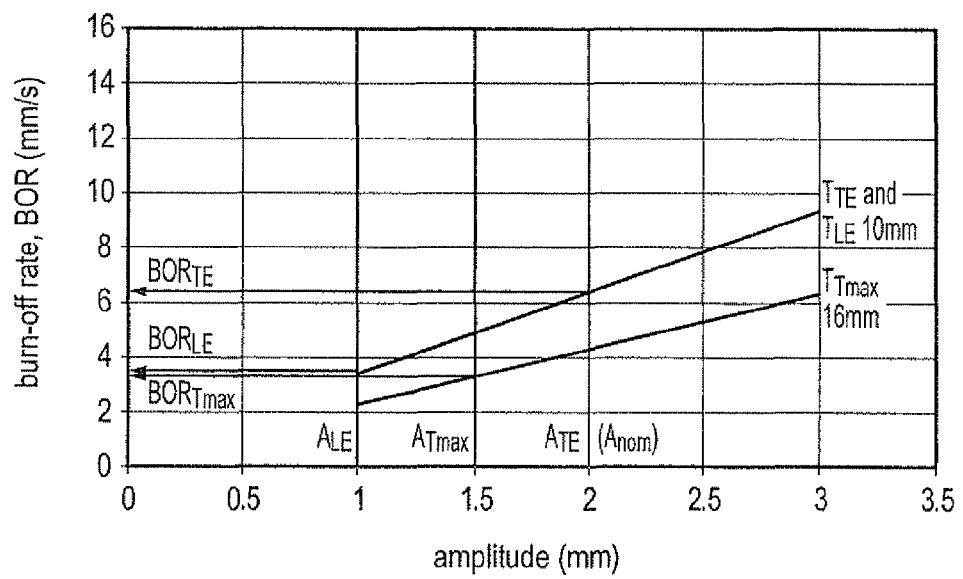

If the local amplitudes of oscillation at $T_{Tmax}$, $T_{LE}$ and $T_{TE}$ were all 2 mm then, as shown in FIG. 4(a), the burn-off rates at the LE and TE would be higher than at Tmax by an amount ΔBOR (which is about 2 mm/s). However, in practice, due to tool and component deflections, the local amplitude of oscillation can be lower at the stub, with for example a highest amplitude at the TE and a lowest amplitude at LE. Assuming that the amplitude at the TE is 2 mm, the amplitude at LE is 1 mm, and the amplitude at $T_{Tmax}$ is midway between those at TE and LE, FIG. 4(b) shows the corresponding graph of burn-off rate against amplitude. The burn-off rate at LE, despite the reduced width at the LE, is approximately the same as the burn-off rate at Tmax. However, the burn-off rate at the TE is higher than the burn-off rate at Tmax, by an amount which is much greater than 2 mm/s.

Figure 4C:
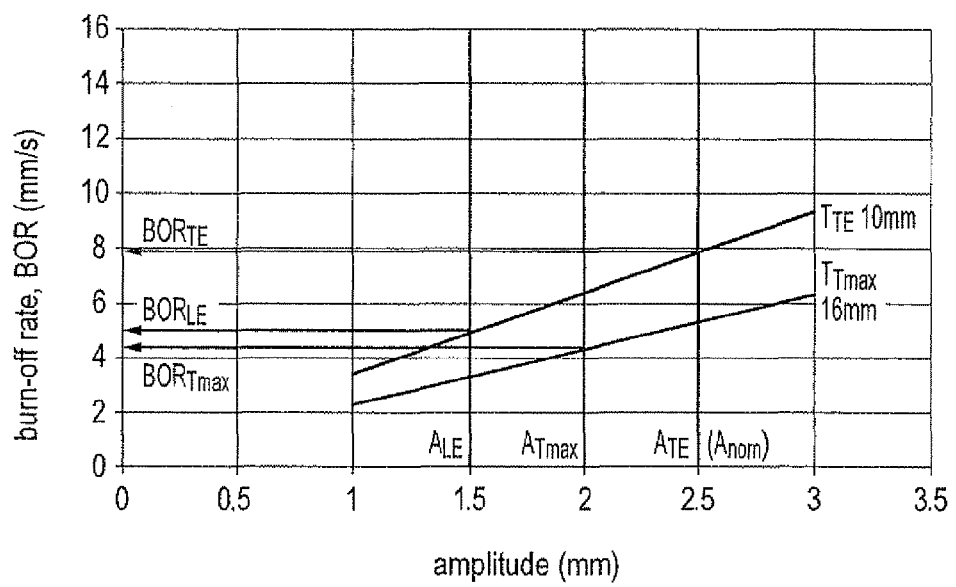

Increasing the input amplitude of oscillation to the blade member to 2.5 mm, as shown in FIG. 4(c), returns the amplitude at Tmax to the previous input amplitude of 2 mm, but still preserves a significant difference in local burn-off rate between TE and Tmax, which difference is much greater than 2 mm/s.

Figure 4D:
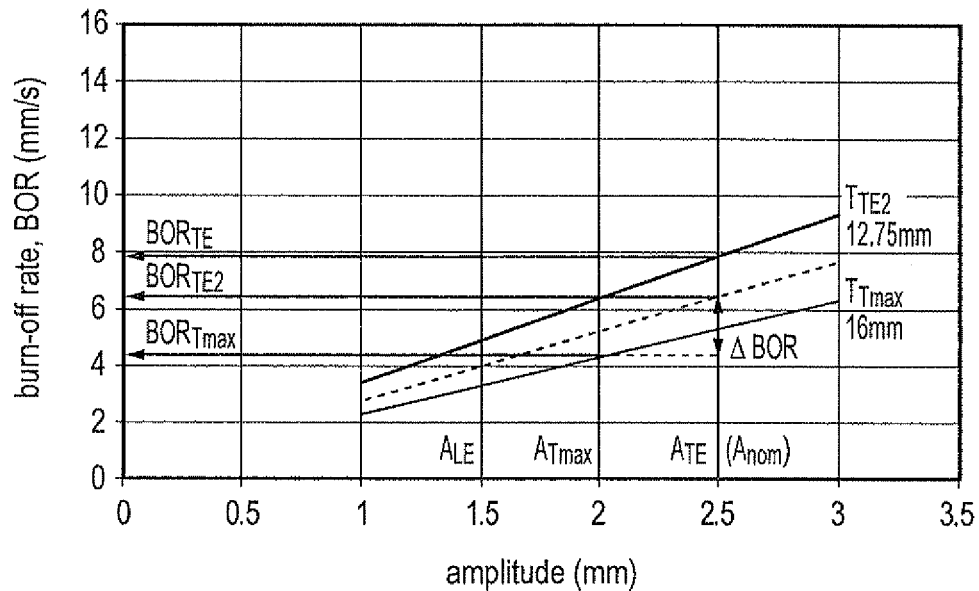

Thus, the width of the stub at the TE can be increased from 10 mm to 12.75 mm. As shown in FIG. 4(d), this reduces the burn-off rate at the TE to an amount which is only about 2 mm/s higher than the burn-off rate at Tmax.

Figure 4E:
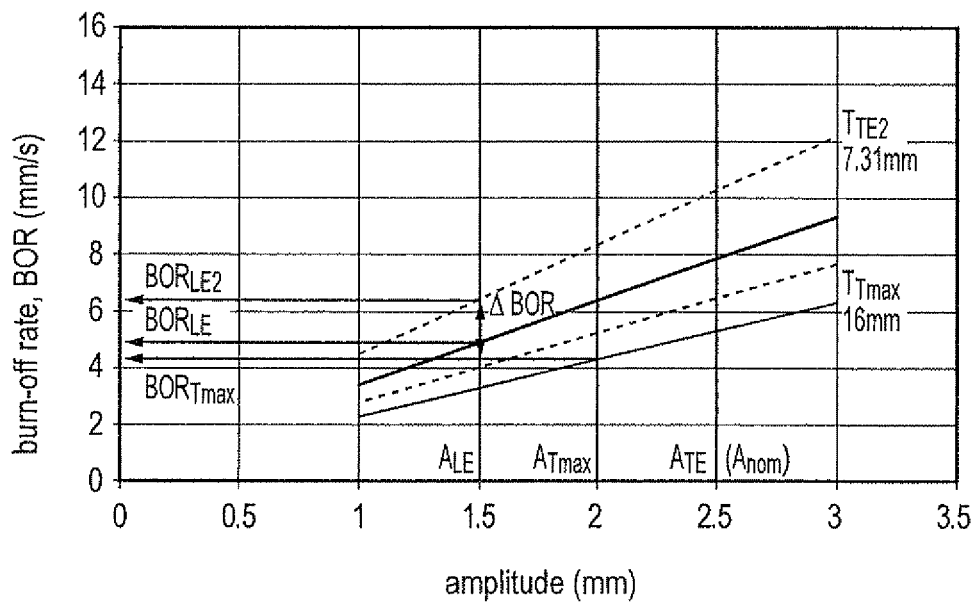

Also, as shown in FIG. 4(e), the width of the stub at the LE can be decreased to 7.31 mm to increase the local burn-off rate at the LE to about 2 mm/s higher than the burn-off rate at Tmax.

In this way, by adjusting the widths along the stub, it is possible to compensate for the variation in the input amplitude of oscillation and hence welding power along the stub caused by the tool and component deflections.

The same approach can be used to account for lost forge pressure as well as lost amplitude. In order to determine the amplitudes and pressures along the stub, a mechanical performance analysis, such as a finite element analysis, of the tooling, blade and disc can be performed. Indeed, after each adaptation of the stub or change of welding operating conditions, a further finite element analysis determination of the amplitudes and pressures along the stub can be obtained, since changing stub widths, input amplitudes or input forge pressures will generally affect the welding response of the stub. In this way a final adapted stub can be arrived at iteratively.

Figure 5:
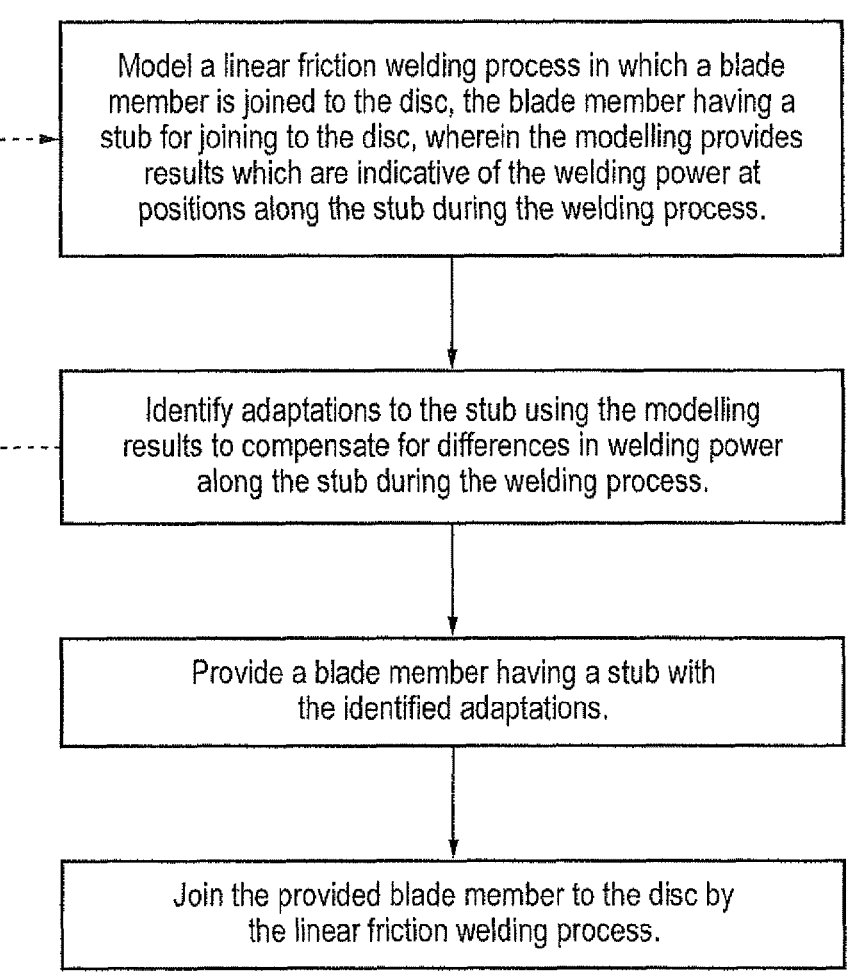
FIG. 5 shows a flow chart of steps in the method of the present invention.

FIG. 5 shows a flow chart of steps in the method of the present invention.

Figure 6:
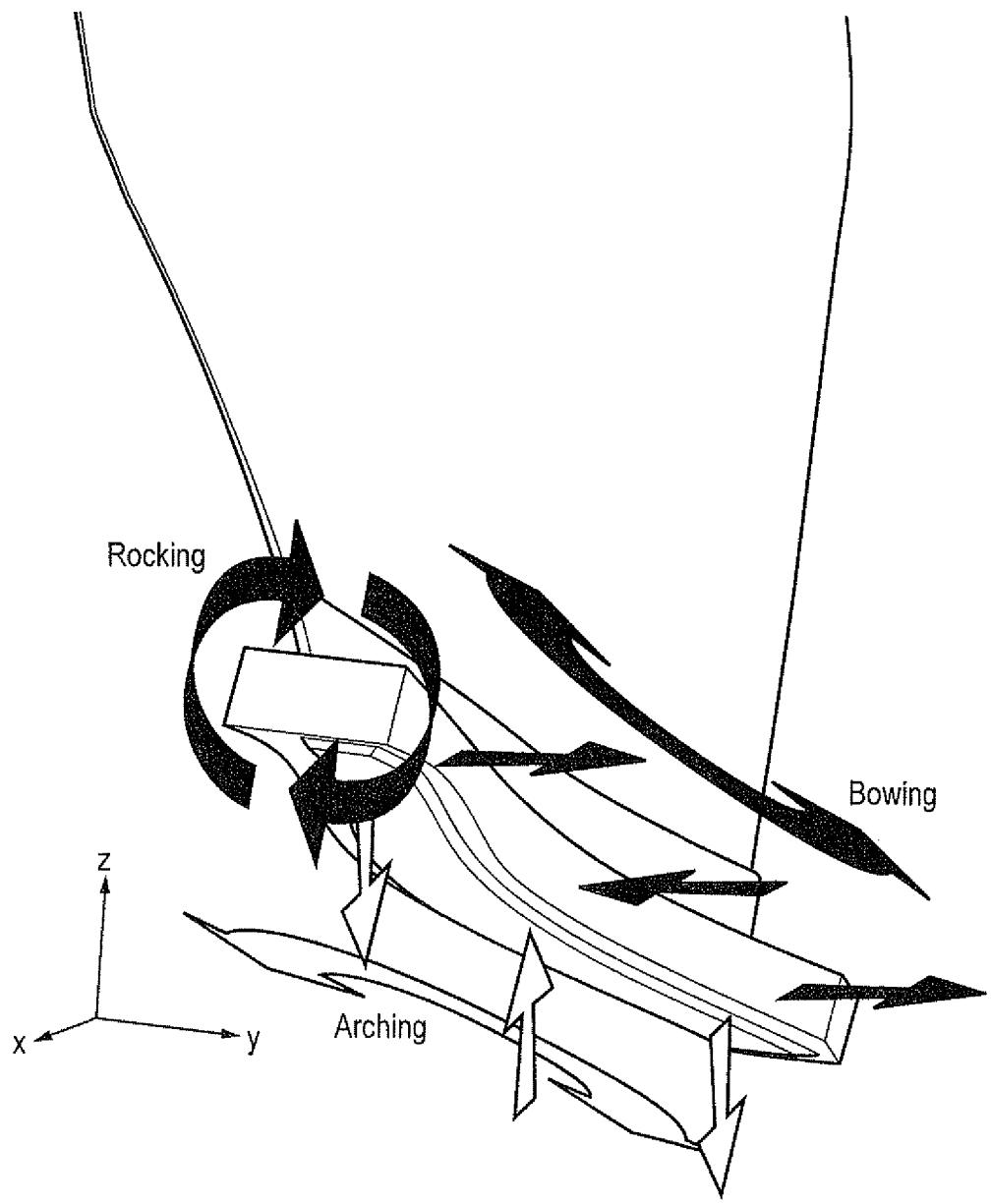
FIG. 6 shows schematically modes of deflection of a blade stub.

Conventional machine/tooling systems are usually arranged to minimise elastic deflections by the use of large clamp frames and large tooling masses of. FIG. 6 shows schematically modes of deflection of the stub known respectively as bowing (differential deflection in the oscillation direction), arching (differential deflection in the forge direction) and rocking (angular rotation of the weld stub about a longitudinal axis through the stub). Bowing is primarily caused by increased restraint of the stub at the ends than the centre. Bowing displacements mean that a varying amount of work may be performed along the length of the weld stub. Arching is influenced by the stiffness of the blade, tooling or disc in the forge direction. The arched shape adopted by the stub indicates how the forge force will be distributed along the length of the stub. A higher level of arching is indicative of uneven pressure distribution on the stub and hence uneven burn-off of the weld interface. Rocking indicates the deviation of the stub from parallel during weld oscillations. Allowing larger variation in particularly bowing and arching of the disc and stub through application of the method of the present invention can lead to some or all of the following advantages:
- reduction in tooling/machine complexity, since reduced stiffnesses can be accommodated,
- enables smaller and/or more slimline sacrificial blade foot shapes (the "foot" being where the clamp loads and process forces are applied),
- increased accessibility to the weld for on-machine flash trimming due to a smaller, less stiff, blade foot,
- enables use of nearer nett shape disc forging via reduction in sacrificial, stiffening, "clamp" material (the clamp material is extra material added to the disc forging that allows the forging to be held stationary against the tangential oscillations and radial forging load—the extra material must eventually be removed, e.g. by machining, to form the final disc)
- reduction in oscillation mass of blade member and tooling,
- increased freedom of machine, tooling and component forging shape.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of making an aerofoil blisk comprising a plurality of aerofoil blades joined to a disc and extending radially outward from the disc, the method including the steps of:
   (a) modelling a linear friction welding process in which a blade member is joined to the disc, the blade member having a stub for joining to the disc, wherein the modelling provides results which are indicative of a welding power at positions along the stub during the linear friction welding process;
   (b) identifying adaptations to the stub using the modelling results to compensate for differences in welding power along the stub during the linear friction welding process;
   (c) providing a blade member having a stub with the identified adaptations; and
   (d) joining the provided blade member to the disc by the linear friction welding process.

2. A method according to claim 1, wherein step (a) includes modelling a mechanical response of the stub and the disc during the linear friction welding process.

3. A method according to claim 1, wherein, in step (a), the modelling provides results which include at least one of amplitudes of welding oscillation at positions along the stub during the linear friction welding process and welding pressures at positions along the stub during the linear friction welding process.

4. A method according to claim 1, wherein, in step (b), the adaptations include varying widths of the stub at positions along the stub, the widths being in the direction of welding oscillation.

5. A method according to claim 1, wherein, in step (a), the positions at which the modelling provides results include leading edge, mid-chord and trailing edge positions of the stub.

6. A method according to claim 1, wherein steps (a) and (b) are performed iteratively to refine the adaptations of the stub.

7. A method according to claim 1, wherein, in step (a), the modelling provides results which are indicative of elastic deflections on welding power.

8. A method according to claim 1, wherein, in step (b), the compensation for differences in welding power reduces differences in burn-off rate along the stub during the linear friction welding process.

9. A method according to claim 1, wherein, in step (a), the modelling includes a finite element analysis of the blade member.

10. A method of making an aerofoil blisk comprising a plurality of aerofoil blades joined to a disc to extend radially outwardly from the disc, the method including the steps of:
   (a) modelling a linear friction welding process in which a blade member is joined to the disc, the blade member having a stub for joining to the disc, wherein the modelling provides results which are indicative of a welding power at positions along the stub during the linear friction welding process;
   (b) identifying adaptations to the stub using the modelling results to compensate for differences in welding power along the stub during the linear friction welding process;
   (c) providing a blade member having a stub with the identified adaptations; and
   (d) joining the provided blade member to the disc by the linear friction welding process,
   wherein, in step (b), the modelling results are used in a correlation between a burn-off rate at a position along the stub and a term:

$$w/(a^m \cdot f \cdot (\ln P)^n)$$

to identify the adaptations, wherein w is a width of the stub at the position in the direction of welding oscillation, a is a welding oscillation at the position, f is a welding oscillation frequency, P is a forge pressure at the position, and m and n are material dependent constants.

* * * * *